United States Patent
Chen et al.

(10) Patent No.: US 6,810,255 B2
(45) Date of Patent: *Oct. 26, 2004

(54) METHOD AND APPARATUS FOR CONTROLLING TRANSMISSION POWER WHILE IN SOFT HANDOFF

(75) Inventors: Tao Chen, San Diego, CA (US); Jack M. Holtzman, San Diego, CA (US); Leonid Razoumov, San Diego, CA (US); Shim Patel, San Diego, CA (US); Keith Saints, San Diego, CA (US); Edward G. Tiedemann, Jr., San Diego, CA (US)

(73) Assignee: Qualcomm, Incorporated

( * ) Notice: Subject to any disclaimer, the term of this patent is extended or adjusted under 35 U.S.C. 154(b) by 5 days.

This patent is subject to a terminal disclaimer.

(21) Appl. No.: 10/286,285

(22) Filed: Nov. 1, 2002

(65) Prior Publication Data

US 2003/0054825 A1 Mar. 20, 2003

Related U.S. Application Data

(63) Continuation of application No. 09/204,803, filed on Dec. 3, 1998, now Pat. No. 6,512,925.

(51) Int. Cl.$^7$ ................................................ H04Q 7/00
(52) U.S. Cl. .................................. 455/437; 455/522
(58) Field of Search .................... 455/437, 69, 442, 455/522, 463; 370/335, 318

(56) References Cited

U.S. PATENT DOCUMENTS

| | | | |
|---|---|---|---|
| 3,925,782 A | 12/1975 | Anderl et al. ............... | 343/178 |
| 4,112,257 A | 9/1978 | Frost ............................... | 179/2 |
| 4,123,718 A | 10/1978 | Lampert et al. ............ | 325/474 |
| 4,193,031 A | 3/1980 | Cooper ........................ | 455/38 |

(List continued on next page.)

FOREIGN PATENT DOCUMENTS

| | | |
|---|---|---|
| EP | 0822672 | 2/1998 |
| WO | 9734439 | 9/1997 |
| WO | 9811677 | 3/1998 |
| WO | 9931819 | 6/1999 |

*Primary Examiner*—Nick Corsaro
(74) *Attorney, Agent, or Firm*—Philip R. Wadsworth; Thien T. Nguyen; S. Hossain Beladi (57) ABSTRACT

Method and apparatus for adjusting the transmission power of base stations in simultaneous communication with a mobile station. The methods described provide for the transmission power of the base stations to be aligned. In the first exemplary embodiment, the transmitters are attached to a separate control unit through communication links. The control unit then derives the most likely command stream and send that to the base stations. In the second exemplary embodiment, the control unit periodically receives the final or average transmit level in a period and an aggregate quality measure for the feedback during a period from each of the transmitters. The control unit determines the aligned power level and transmits a message indicative of the aligned power level to the transmitters. In the third exemplary embodiment, the transmitters send the control unit a message indicative of the transmit power of transmissions to the receiver. The control unit determines the aligned transmit power based on the current transmit power.

2 Claims, 7 Drawing Sheets

U.S. PATENT DOCUMENTS

| | | |
|---|---|---|
| 4,222,115 A | 9/1980 | Cooper et al. ............... 375/1 |
| 4,225,976 A | 9/1980 | Osborne et al. ............ 455/226 |
| 4,495,648 A | 1/1985 | Giger ........................ 455/73 |
| 4,580,262 A | 4/1986 | Naylor et al. ............... 371/5 |
| 4,613,990 A | 9/1986 | Halpern ..................... 455/333 |
| 4,641,322 A | 2/1987 | Hasegawa .................. 375/1 |
| 4,672,658 A | 6/1987 | Kavehrad et al. .......... 379/63 |
| 4,765,753 A | 8/1988 | Schmidt ..................... 379/60 |
| 4,777,653 A | 10/1988 | Bonnerot et al. .......... 455/69 |
| 4,811,421 A | 3/1989 | Havel et al. ................ 455/69 |
| 4,868,795 A | 9/1989 | McDavid et al. ........... 367/77 |
| 4,870,698 A | 9/1989 | Katsuyama et al. ........ 455/67 |
| 5,093,840 A | 3/1992 | Schilling .................... 375/1 |
| 5,107,487 A | 4/1992 | Vilmur et al. .............. 370/18 |
| 5,267,262 A | 11/1993 | Wheatley, III ............. 375/1 |
| 5,771,451 A | 6/1998 | Takai et al. ................ 455/442 |
| 6,512,925 B1 * | 1/2003 | Chen et al. ................ 455/442 |

* cited by examiner

METHOD AND APPARATUS FOR CONTROLLING TRANSMISSION POWER WHILE IN SOFT HANDOFF

This application is a continuation application of application Ser. No. 09/204,803, filed Dec. 3, 1998, now U.S. Pat. No. 6,512,925.

BACKGROUND OF THE INVENTION

I. Field of the Invention

The present invention relates to communications. More particularly, the present invention relates to a novel and improved method and apparatus for gating the transmission of signals in a wireless communication system.

II. Description of the Related Art

The use of code division multiple access (CDMA) modulation techniques is one of several techniques for facilitating communications in which a large number of system users are present. Other multiple access communication system techniques, such as time division multiple access (TDMA) and frequency division multiple access (FDMA) are known in the art. However, the spread spectrum modulation technique of CDMA has significant advantages over these modulation techniques for multiple access communication systems. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS", assigned to the assignee of the present invention, of which the disclosure thereof is incorporated by reference herein. The use of CDMA techniques in a multiple access communication system is further disclosed in U.S. Pat. No. 5,103,459, entitled "SYSTEM AND METHOD FOR GENERATING SIGNAL WAVEFORMS IN A CDMA CELLULAR TELEPHONE SYSTEM", assigned to the assignee of the present invention, of which the disclosure thereof is incorporated by reference herein.

CDMA by its inherent nature of being a wideband signal offers a form of frequency diversity by spreading the signal energy over a wide bandwidth. Therefore, frequency selective fading affects only a small part of the CDMA signal bandwidth. Space or path diversity is obtained by providing multiple signal paths through simultaneous links from a mobile user through two or more cell-sites. Furthermore, path diversity may be obtained by exploiting the multipath environment through spread spectrum processing by allowing a signal arriving with different propagation delays to be received and processed separately. Examples of path diversity are illustrated in U.S. Pat. No. 5,101,501 entitled "METHOD AND SYSTEM FOR PROVIDING A SOFT HANDOFF IN COMMUNICATIONS IN A CDMA CELLULAR TELEPHONE SYSTEM", and U.S. Pat. No. 5,109,390 entitled "DIVERSITY RECEIVER IN A CDMA CELLULAR TELEPHONE SYSTEM", both assigned to the assignee of the present invention and incorporated by reference herein.

A method for transmission of speech in digital communication systems that offers particular advantages in increasing capacity while maintaining high quality of perceived speech is by the use of variable rate speech encoding. The method and apparatus of a particularly useful variable rate speech encoder is described in detail in U.S. Pat. No. 5,414,796, entitled "VARIABLE RATE VOCODER", assigned to the assignee of the present invention and incorporated by reference herein.

The use of a variable rate speech encoder provides for data frames of maximum speech data capacity when said speech encoding is providing speech data at a maximum rate. When a variable rate speech coder is providing speech data at a less that maximum rate, there is excess capacity in the transmission frames. A method for transmitting additional data in transmission frames of a fixed predetermined size, wherein the source of the data for the data frames is providing the data at a variable rate is described in detail in U.S. Pat. No. 5,504,773, entitled "METHOD AND APPARATUS FOR THE FORMATTING OF DATA FOR TRANSMISSION", assigned to the assignee of the present invention, of which the disclosure thereof is incorporated by reference herein. In the above mentioned patent application a method and apparatus is disclosed for combining data of differing types from different sources in a data frame for transmission.

In frames containing less data than a predetermined capacity, power consumption may be lessened by transmission gating a transmission amplifier such that only parts of the frame containing data are transmitted. Furthermore, message collisions in a communication system may be reduced if the data is placed into frames in accordance with a predetermined pseudorandom process. A method and apparatus for gating the transmission and for positioning the data in the frames is disclosed in U.S. Pat. No. 5,659,569, entitled "DATA BURST RANDOMIZER", assigned to the assignee of the present invention, of which the disclosure thereof is incorporated by reference herein.

A useful method of power control of a mobile in a communication system is to monitor the power of the received signal from the mobile station at a base station. The base station in response to the monitored power level transmits power control bits to the mobile station at regular intervals. A method and apparatus for controlling transmission power in this fashion is disclosed in U.S. Pat. No. 5,056,109, entitled "METHOD AND APPARATUS FOR CONTROLLING TRANSMISSION POWER IN A CDMA CELLULAR MOBILE TELEPHONE SYSTEM", assigned to the assignee of the present invention, of which the disclosure thereof is incorporated by reference herein.

In a communication system that provides data using a QPSK modulation format, very useful information can be obtained by taking the cross product of the I and Q components of the QPSK signal. By knowing the relative phases of the two components, one can determine roughly the velocity of the mobile station in relation to the base station. A description of a circuit for determining the cross product of the I and Q components in a QPSK modulation communication system is disclosed in U.S. Pat. No. 5,506,865, entitled "PILOT CARRIER DOT PRODUCT CIRCUIT", assigned to the assignee of the present invention, the disclosure of which is incorporated by reference herein.

There has been an increasing demand for wireless communications systems to be able to transmit digital information at high rates. One method for sending high rate digital data from a remote station to a central base station is to allow the remote station to send the data using spread spectrum techniques of CDMA. One method that is proposed is to allow the remote station to transmit its information using a small set of orthogonal channels, this method is described in detail in copending U.S. Pat. No. 08/886,604, entitled "HIGH DATA RATE CDMA WIRELESS COMMUNICATION SYSTEM", assigned to the assignee of the present invention and incorporated by reference herein.

SUMMARY OF THE INVENTION

The present invention is a novel and improved method and apparatus for controlling the transmission power in a plurality of base stations simultaneously communicating with a mobile station in soft handoff. In a power controlled communication system where multiple transmitters at different physical locations are employed to transmit the same signal to a given receiver, the receiver measures the quality of the composite received signal from all transmitters and feeds back this observed quality to the transmitters. In the exemplary implementation, the feedback is a single stream of up or down commands from the receiver that is received by all transmitters involved. However, the reliability of the reception is not uniform across transmitters. Further, the reliability of the feedback to any given transmitter can change over time. As a result, the transmitters follow their individually received feedback and transmit at different power level at the same time.

It is usually advantageous to align the transmit power levels for a given receiver from all participating transmitters according to a desired pattern. For example, the transmitters can also send a fixed pilot channel at the same power level. Equating the traffic channel transmit levels imply the same traffic to pilot ratios across transmitters and the best maximal ratio combining can be achieved at the receiver by taking the inner product of the pilot and traffic. Another example is when the transmitters transmitter have different maximum power and send out pilot channel at different power levels. In this case, the alignment of traffic channel power means the transmitters set their traffic transmit levels proportional to their pilot levels. This also achieves the same traffic to pilot ratios across all transmitters. Yet another example of transmit power level alignment is a system where there is a desired transmit power level pattern based on the signal-to-noise ratio or SNR from each transmitter to the receiver. If transmitter 1's pilot SNR is twice that of transmitter 2's, then the traffic transmit level from transmitter 1 should be twice that of transmitter 2's. This transmit level pattern can be followed by all transmitters as the overall transmit level changes according to the feedback command. The present invention proposes a series of methods that can be used to align the transmit power of transmissions to a mobile station in soft handoff.

In the first exemplary embodiment, the transmitters are attached to a separate control unit through communication links. This control unit receives the power control commands received at each base station and optionally a quality indicator for each command from each base station. The control unit then derives the most likely command stream and send that to the base stations. The base stations use this to override the transmit power level they were using, or use it plus the feedback commands it received during the processing and relaying of this most likely command to determine the transmit level.

In the second exemplary embodiment, the control unit periodically receives the final or average transmit level in a period and an aggregate quality measure for the feedback during a period from each of the transmitters. The control unit determines the aligned power level and transmits a message indicative of the aligned power level to the transmitters.

In the third exemplary embodiment, the transmitters send the control unit a message indicative of the transmit power of transmissions to the receiver. The control unit determines the aligned transmit power based on the current transmit power. For example, the control unit can inform all transmitters of the average value of the transmit traffic to pilot ratios it most recently received from the transmitters if the desired transmit power level pattern is to have all traffic to pilot ratios identical. The transmitters would then make corrections to its current transmit level by the delta between what it received from the control unit and what it actually used at the time corresponding to that.

In the fourth exemplary embodiment, transmitters send the control unit a message indicative of the transmit power of transmissions to the mobile station. The control unit determines the aligned transmit power based on the current transmit power. The correction is done only when the transmit levels diverge beyond a certain threshold from the desired pattern. This thresholding can lessen the backhaul loading. Also, the correction can be less than what is needed for full alignment to lessen the impact on the closed loop and outerloop operation. For example, assume the desired alignment pattern is to have all transmitters to transmit at identical traffic to pilot ratios, when the difference between the highest and the lowest transmit levels is less than X dB, the control unit sends no correction to the transmitters. (Or, it sends the individual corrections or the common desired level but the transmitters do not correct if the needed correction is less than Y dB.) When there is a difference equal to or larger than X dB, the control unit computes the average transmit traffic to pilot ratio and forwards it to the transmitters. The transmitters computes the necessary correction and applies it. Alternatively, the control unit can compute the amount of correction for all the transmitter and send them individually to the transmitters where they are applied. The correction can be a fixed percentage of the necessary amount to bring all transmitters together. Or the correction can be a fixed step, say Z dB; or a fixed percentage of the necessary step, say W %, regardless of what is necessary to get all transmitters aligned. In addition, this correction can be applied gradually over time. The full desired correction is achieved right before the next correction is received from the control unit.

In the fifth exemplary embodiment, similar to the previous two embodiments, the correction can be derived from the quality indicator of the feedback at each transmitter. For example, this quality indicator can be based on the strength of the reverse link pilot or the amount of time it is in lock at each of the transmitters. The quality indicator can also be based on reverse link frame erasures at the transmitters. It can also depend on the signal to noise and interference ratio (Ec_pilot/Nt summed over all fingers locked on a given BTS) for each transmitter at the receiver. That is, when the control unit examines the transmit levels from the transmitters, the transmit levels or traffic to pilot ratios used by the transmitters that have better feedback quality, and by those transmitters whose signal is stronger at the receiver should be emphasized. The above will improve the 'correct' transmit level since the correlation between forward link and reverse link is usually positive, and a clear feedback indicates a stronger forward link at the receiver. Therefore, if the transmit level at the transmitter that has a better feedback quality is modified the least, the impact on the total received Eb/Nt at the receiver would be less and the impact on the closed loop and outer loop is minimized.

In the sixth exemplary embodiment, the transmitters and/or the control unit apply a soft mapping between the received feedback strength and the amount of transmit level adjustment. That is, the step size in the adjustment is a real number whose value depends on the value of the feedback command signal to noise ratio. A threshold can be set so that when the signal to noise ratio of the feedback is too low, the power control step size is zero. Additionally, when the feedback receiver at a transmitter is out of lock and no feedback SNR can be measured, there will be no corresponding adjustment for the transmit level. If a control unit has access to the quality of the feedback commands at the transmitters, it can use the same soft mapping to determine the most likely commands (for the first exemplary embodiment) or the most likely transmit level or traffic to pilot ratio based on the most recent feedback quality (for the second exemplary embodiment).

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

I. Introduction

Figure 1:
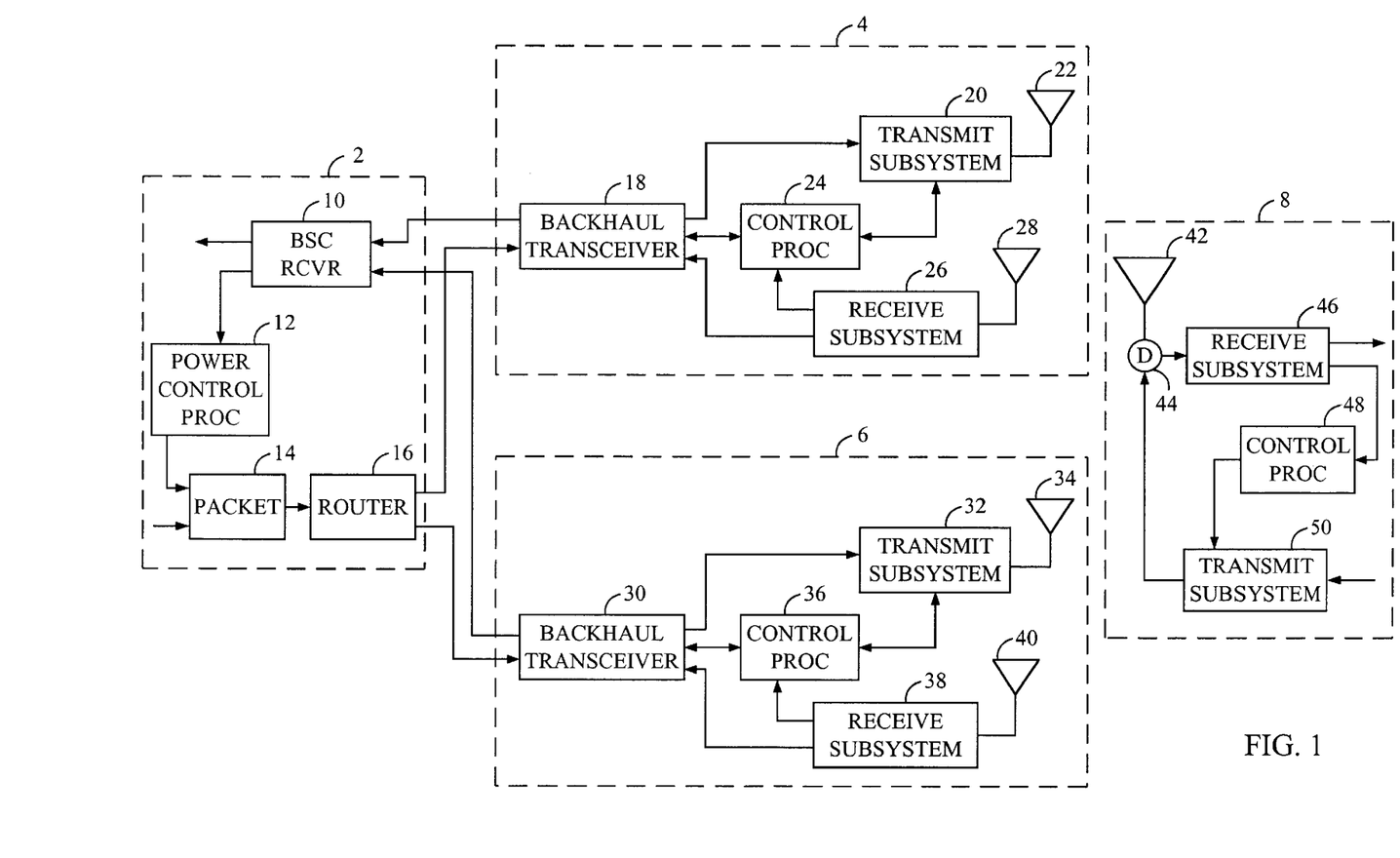
FIG. 1 is a block diagram illustrating the mobile communication system of the present invention.

Turning to the figures, FIG. 1 illustrates mobile station 8 in soft handoff with base station 4 and base station 6. In soft handoff, base station 4 and base station 6 transmit identical information to mobile station 8. The path diversity provides improved estimation of the transmitted signal and reduces the probability of a dropped call. The exemplary embodiment for performing soft handoff is described in detail in the aforementioned U.S. Pat. No. 5,101,501.

In the exemplary embodiment of the present invention, aligning the transmit power of base station is equivalent to make certain that the traffic channel energy to pilot channel energy is equal in both base stations 4 and 6. In most cases, the base stations are transmitting their pilot channels at the same energy such that aligning the traffic channel energy will be equivalent to setting the traffic channel transmit power from the two base stations to mobile station 8 to be equal. The present invention is equally applicable to other power management strategies, as long as the relationship between the transmit power of the two base stations is known in advance of the alignment procedure. This does not require that the power relationship be static.

The signals transmitted on the forward link from base stations 4 and 6 to mobile station 8. In base station 4, information to be transmitted to mobile station 8 is provided from base station controller 2 to backhaul transceiver 18. The information is provided to transmit system 20 which modulates the information and upconverts the information and transmits the resulting signal through antenna 22. Similarly, in base station 6, information to be transmitted to mobile station 8 is provided from base station controller 2 to backhaul transceiver 30. The information is provided to transmit system 32 which modulates the information and upconverts the information and transmits the resulting signal through antenna 34.

Figure 2:
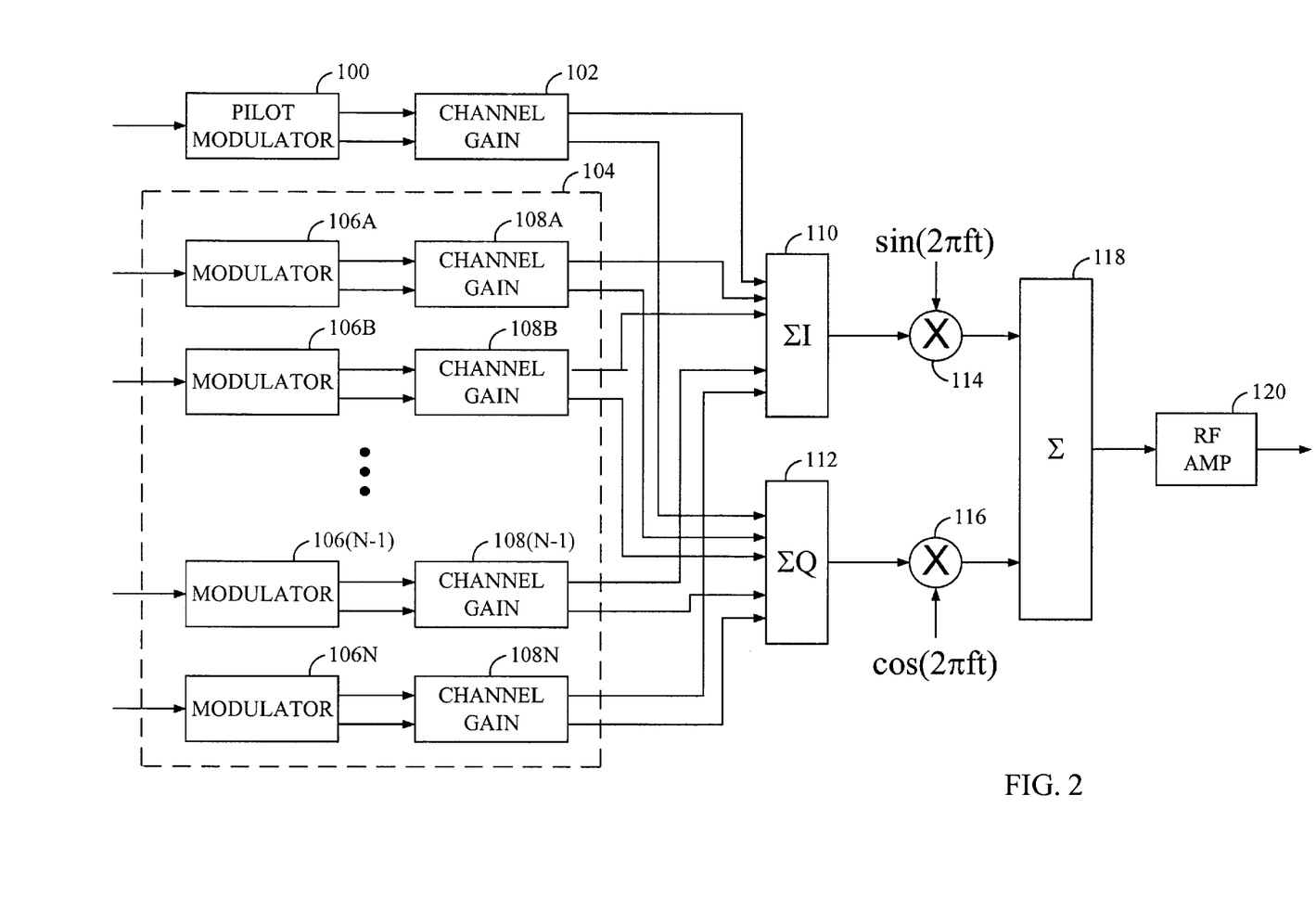
FIG. 2 is a block diagram illustrating the exemplary transmit subsystem of the base station of the present invention.

FIG. 2 illustrates the exemplary embodiment of transmit subsystem 20 and transmit subsystem 32. In the exemplary embodiment, the forward link signal consists of a plurality of separately gain adjusted traffic signals and a pilot channel. The pilot channel is provided to allow for coherent demodulation of the traffic channels and to facilitate system acquisition. The use of a pilot channel in a wireless communication system is described in detail in the aforementioned U.S. Pat. No. 5,103,459.

A predetermined set of pilot symbols are provided to pilot modulator 100. In the exemplary embodiment, the signal is a QPSK (Quaternary Phase Shift Keying) modulated signal and as such the modulated signal comprises an inphase (I) component and an out of phase (Q) component. The modulated symbols are provided to channel gain element 102. Channel gain element 102 adjusts the amplitude of the pilot channel relative to the traffic channels. The in phase components of the modulated streams are provided to I channel summer 110 and the out of phase components of the modulated streams are provided to Q channel summer 112.

User specific traffic data is provided to traffic modulator bank 104. The backhaul transceiver (18 and 30) route the traffic data to the appropriate traffic modulator (106a–106N). The data is modulated in such a fashion that the correct mobile station can receive the information. In the exemplary embodiment, the traffic data is modulated in accordance with a code division multiplexing or CDM modulation format.

Figure 3:
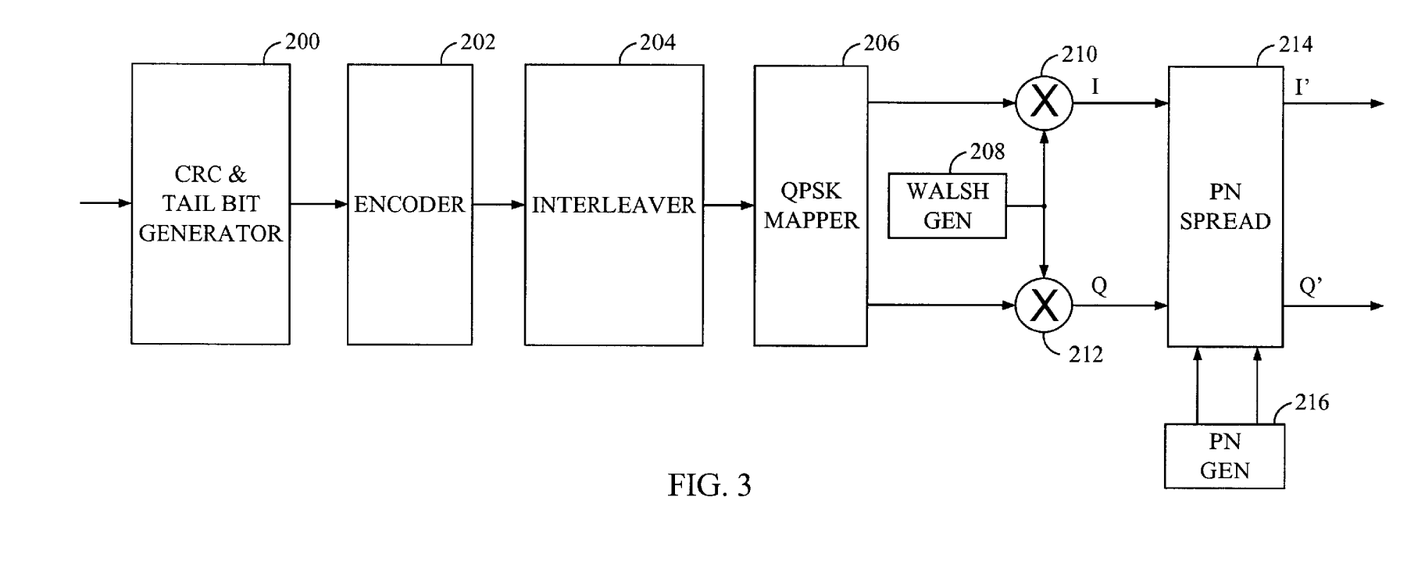
FIG. 3 is a block diagram illustrating the exemplary forward link modulator of the present invention.

FIG. 3 illustrates the CDM modulator (106a–106N) in greater detail. The information packet to be transmitted is provided to CRC and tail bit generator 200. A set of parity bits and a predetermined set of tails bits are generated and appended to the frame. The frame is provided to encoder 202. Encoder 202 provide forward error correction coding on the packet. In the exemplary embodiment, encoder 202 is a convolutional encoder the design of which is well known in the art. Alternatively, encoder 202 is a turbo encoder, the design of which is also well known in the art.

The encoded symbols are provided from encoder 202 to interleaver 204. Interleaver 204 reorders the encoded symbols in accordance with a predetermined interleaving format. The reordered symbols are then provided to QPSK mapper 206, which maps two bits into a four point I-Q constellation consisting of I and Q channel components. The I and Q channel components are provided to orthogonal covering elements 210 and 212 respectively. In the exemplary embodiment, the I and Q components are covered using Walsh sequences or their derivatives such as the variable length orthogonal spreading functions described in U.S. Pat. No. 5,751,761, entitled "SYSTEM AND METHOD FOR ORTHOGONAL SPREAD SPECTRUM GENERATION IN VARIABLE DATA RATE SYSTEMS", which is assigned to the assignee of the present invention and incorporated by reference herein. The orthogonal sequence is generated in Walsh generator 208 and provided to orthogonal covering elements 210 and 212. In the exemplary embodiment, orthogonal covering elements 210 and 212 are exclusive OR gates. In the exemplary embodiment, the orthogonal spreading is used for channelization. Thus, each user receives data spread by a unique orthogonal sequence.

The channelized data is provided to PN spreading element 214. In the exemplary embodiment, a complex PN spreading is performed on the channelized data. The complex spreading is performed using two separate PN spreading sequences ($PN_I$ and $PN_Q$), to provide two resultant sequences (I' and Q') of the form:

$$I' = PN_I \cdot I + PN_Q \cdot Q \tag{1}$$

$$Q' = PN_I \cdot I - PN_Q \cdot Q \tag{2}$$

where I and Q are the channelized information sequences into the PN spreading element 214.

Returning to FIG. 2, the traffic modulated data from each of modulators 106a–106N is provided to a corresponding channel gain element 108a–108N. The channel gain elements individually control the transmission to each of the mobile station being served by the base station. Each of channel gain elements 108a–108N receive a signal from the control processor (24 or 36) in the base station and adjust the gain of the modulated signal in accordance therewith.

The gain adjusted I-components of the modulated signals are provided to I channel summing element 110, which sums the I components of all of the modulated signals and provide the summed signal to in-phase upconverter 114. The gain adjusted Q-components of the modulated signals are provided to I channel summing element 112, which sums the I components of all of the modulated signals and provide the summed signal to in-phase upconverter 116.

Upconverter 114 upconverts the signal to the carrier frequency (f) in accordance with the carrier function (sin 2Πf). Upconverter 116 upconverts the signal to the carrier frequency (f) in accordance with the carrier function (cos 2Πf). the upconverted signals are provided to summer 118 which adds the inphase signal to the out of phase signal. The summed signal is provided to RF Amp 120. RF Amp 120 amplifies the signal and referring back to FIG. 1 provides the signal for transmission through antenna 22 or 34.

The signals transmitted by base stations 4 and 6 are received at antenna 42 of mobile station 8. The received signals are provided through duplexer 44 to receive subsystem 46. Receive subsystem 46 downconverts the signal to base band and demodulates the signals. The demodulated signals are soft combined and decoded and provided to the user of mobile station 8. In addition, receive subsystem 8 provides a set of parameters indicative of the quality of the received signals to control processor 48. Control processor 48 determines a power control message and provides the power control message to transmit subsystem 50.

Figure 4:
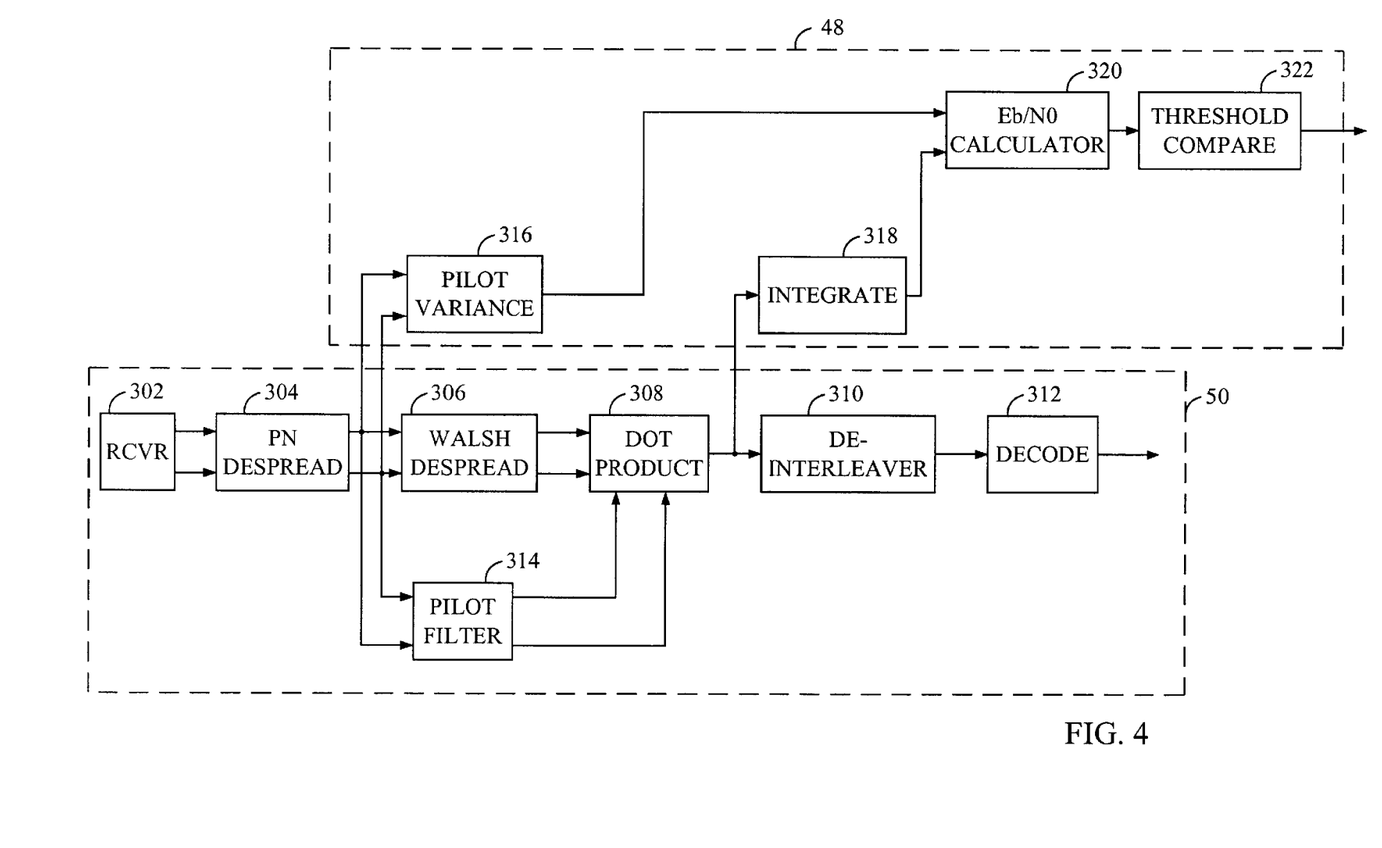
FIG. 4 is a block diagram illustrating the exemplary reverse link receive subsystem and control processor of the present invention.

FIG. 4 illustrates the exemplary embodiment of receive subsystem 46 and control processor 48. The signal is provided to receiver (RCVR) 302. Receiver 302 downconverts, filters and amplifies the received signal and provides the received signal to PN despreader 304. PN despreader 304 despreads the received signals by generating a set of local replicas of the same PN codes generated by PN generator 216. The received signal is multiplied by the PN despreading sequence and integrated by methods that are well known in the art and disclosed in detail in the aforementioned copending U.S. patent application Ser. No. 08/886,604.

The PN despread I and Q components of the signal are provided to control processor 48, pilot filter 314 and Walsh despreader 306. In the exemplary embodiment, pilot filter 314 is a low pass filter that is provided to remove noise from the received pilot signal. Walsh despreader 306 uncovers the traffic channel data in accordance with the orthogonal channel sequences allocated for dedicated transmissions to mobile station 8. Walsh despreader 306 multiplies the PN despread sequences by the orthogonal code and integrates the result over the Walsh symbol length, which is the exemplary embodiment, is 128 Walsh chips in length.

The Walsh uncovered data is provided to dot product circuit 308. Dot product circuit 308 computes the dot product between the received pilot channel and the received Walsh despread data. This removes phase errors from the data which occur during transmission through the propagation path. An exemplary implementation of dot product circuit 308 is described in detail in aforementioned U.S. Pat. No. 5,506,865.

The result from dot product circuit 308 is provided to control processor 48 and to de-interleaver 310. Deinterleaver 310 reorders the demodulated symbols in accordance with a predetermined de-interleaving format and provides the result to decoder 312. Decoder 312 decodes the received data to provided forward error correction on the received data.

Control processor 48 determines the adequacy of the received signals from base stations 4 and 6. The PN despread data provided to pilot variance element 316 computes an estimate of the noise on the received signal. In the exemplary embodiment, the noise on the received signal is estimated by computing the variance in the received pilot signal. This variance is attributable to the noise on the signal and is provided to Eb/N0 calculator 320. The signal from dot product circuit 308 is provided to integrator 318. In the exemplary embodiment, the bit energy of the received signal is computed by integrating the received traffic signal over the power control group duration. The result of the integration process is normalized and provided to Eb/N0 calculator 320.

Eb/N0 calculator 320 divides the bit energy computed in integrator 318 by the noise energy computed in pilot variance element 316, the result is provided to threshold compare 322. In the exemplary embodiment, the computed Eb/N0 value is compared against a nominal threshold value and the result is provided as a signal bit output from control processor 48 to transmit subsystem 50.

Figure 5:
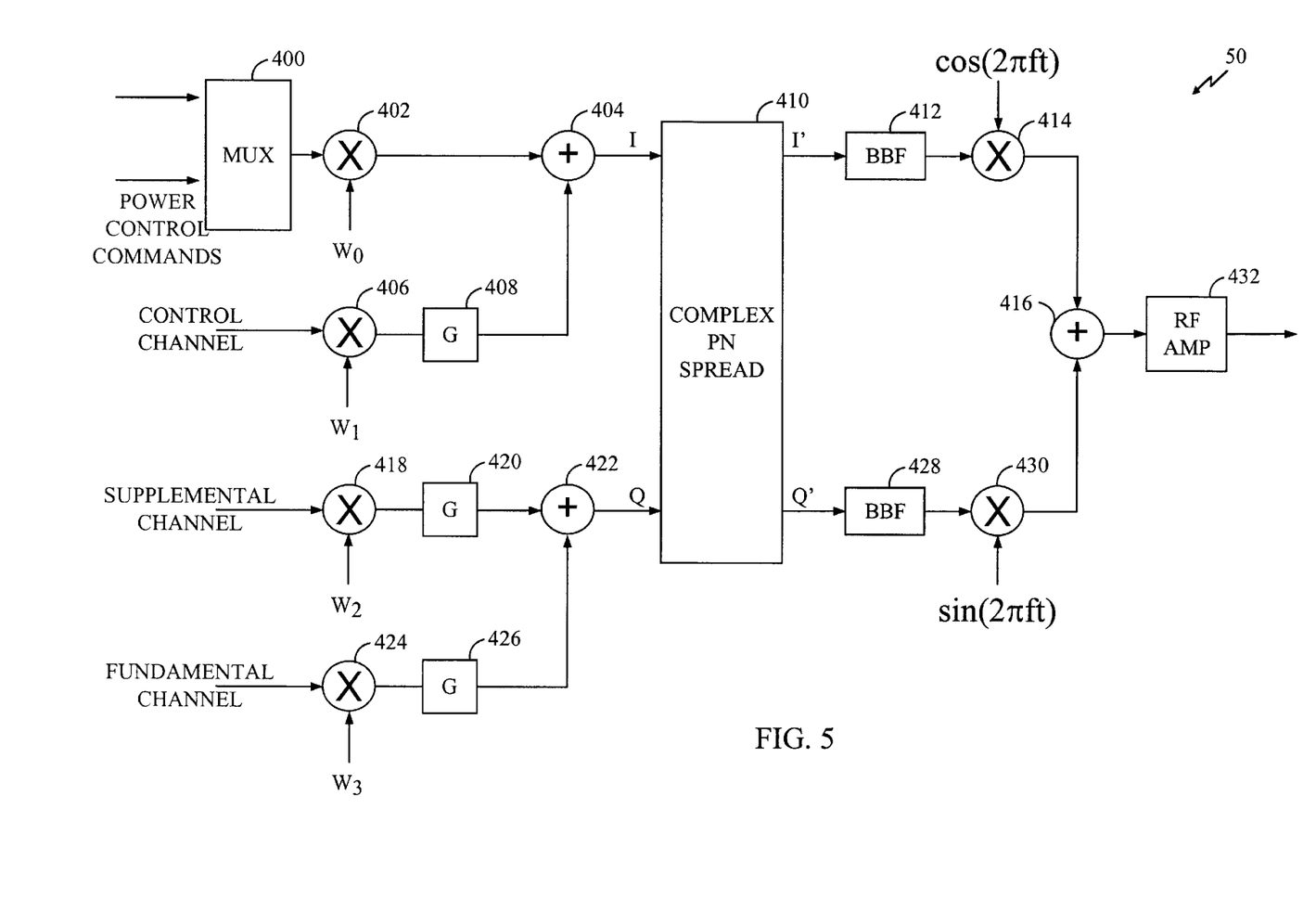
FIG. 5 is a block diagram illustrating the exemplary reverse link transmit receive subsystem of the present invention

FIG. 5 illustrates the exemplary embodiment of transmit subsystem 50. In the exemplary embodiment, mobile station 8 transmits 4 channels of information consisting of: a combined power control and pilot channel, a control channel, a supplemental channel and a fundamental channel. Each channel is distinguished from the others by means of spreading using a set of short orthogonal sequences. This is described in detail in the aforementioned U.S. patent application Ser. No. 08/886,604.

Power control commands and pilot symbols are provided to multiplexer (MUX) 400. In the exemplary embodiment, the power control commands are provided to multiplexer 400 at a rate of 800 bits per second. Multiplexer 400 combines the pilot symbols with the power control commands and provides the combined data to channelization element 402. Channelization element 402 covers the data using a short orthogonal sequence ($W_0$). The Walsh covered sequence is provided to summer 402.

The control channel provides a means for sending control messages from mobile station 8 back to base stations 4 and 6. The control messages are provided to channelization element 406. Channelization element 402 covers the data using a short orthogonal sequence ($W_1$). The Walsh covered sequence is provided to gain element 408 which adjusts the gain of the control channel relative to the gain of the pilot channel. The gain adjusted control channel signal is provided to a second input to summer 402.

The supplemental channel provides a means for sending information in excess of the capacity of the fundamental channel from mobile station 8 back to base stations 4 and 6. The supplemental channel data is provided to channelization element 418. Channelization element 418 covers the data using a short orthogonal sequence ($W_2$). The Walsh covered sequence is provided to gain element 420 which adjusts the gain of the control channel relative to the gain of the pilot channel. The gain adjusted control channel signal is provided to a first input to summer 422.

The fundamental channel provides a means for sending primary information from mobile station 8 back to base stations 4 and 6. The fundamental channel data is provided to channelization element 424. Channelization element 424 covers the data using a short orthogonal sequence ($W_2$). The Walsh covered sequence is provided to gain element 426 which adjusts the gain of the control channel relative to the gain of the pilot channel. The gain adjusted control channel signal is provided to a second input to summer 422.

The summed signals from summer 404 and 422 are provided as I and Q signals to complex PN spreader 410. Complex PN spreader 410 spreads the input sequences in accordance with two PN sequences $PN_I$ and $PN_Q$ as described in equations (1) and (2) above. The complex PN spread sequences (I' and Q') are provided to baseband filters 412 and 428. Baseband filters 412 and 428 filter the sequences and provided the filtered results to upconverters 414 and 430 which upconvert the signals in accordance with a QPSK modulation format. The in-phase and out-phase components are provided to summing element 416. The resulting summed signal from summer 416 is provided to RF amplifier 432 which amplifies the signal for transmission.

Referring back to FIG. 1, the amplified signal is provided through duplexer 44 for transmission through antenna 42. In base station 4, the signal transmitted by mobile station 8 is received at antenna 28 and provided to receive subsystem 26, which downconverts and demodulates the received signal. Similarly, in base station 6, the signal transmitted by mobile station 8 is received at antenna 40 and provided to receive subsystem 38, which downconverts and demodulates the received signal.

Figure 6:
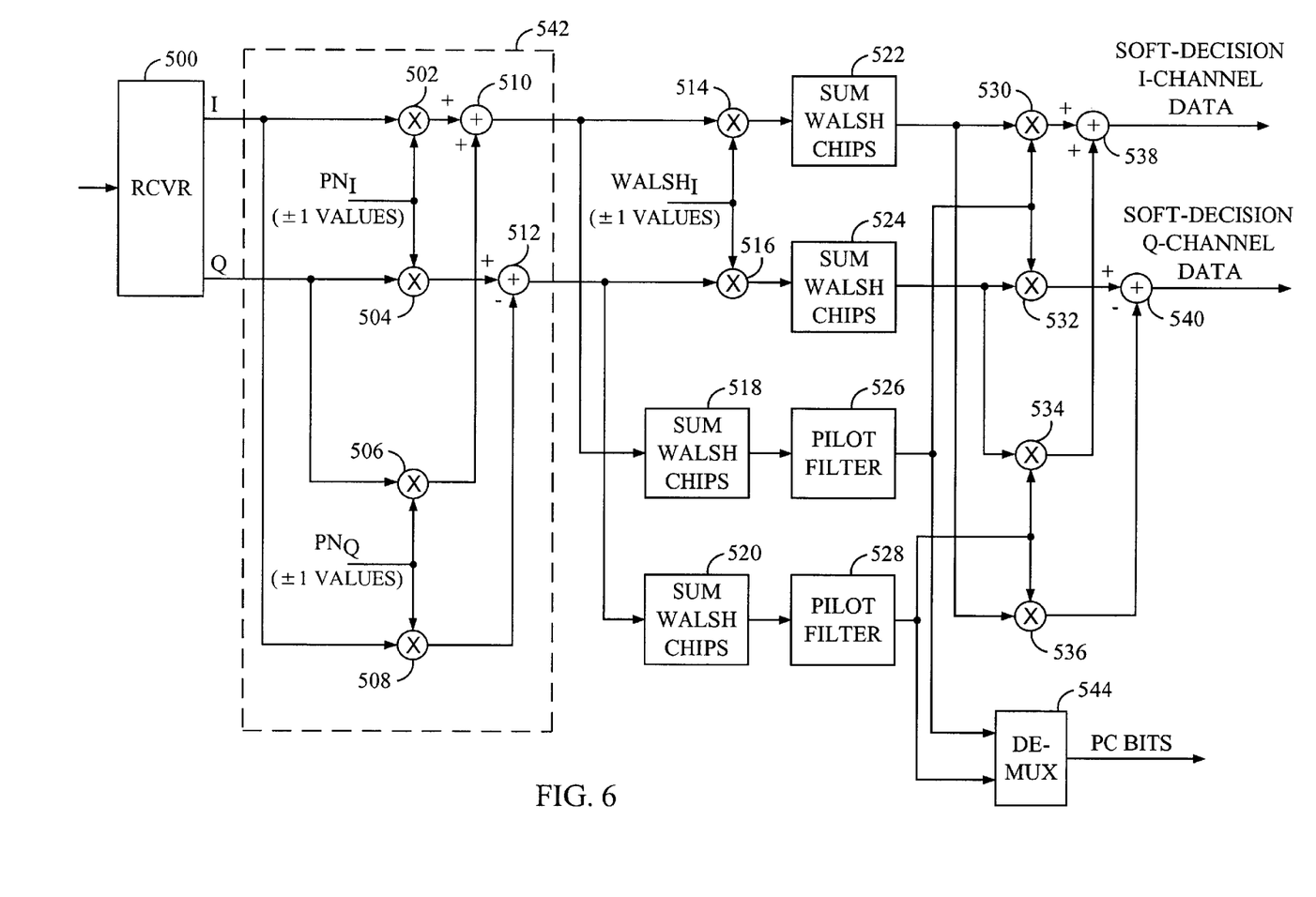
FIG. 6 is a block diagram illustrating the exemplary receive subsystem of the present invention.

FIG. 6 illustrates the exemplary embodiment of receive subsystems 26 and 38. FIG. 6 has been simplified to show only the demodulation of one of the four orthogonal channels received from mobile station 8. The received signal is provided to receiver 500, which downconverts, filters and amplifies the received signal in accordance with a QPSK demodulation format and provides the received I and Q components to complex despreading element 542. Complex despreading element 542 despreads the received signal in accordance with two locally generated PN sequences $PN_I$ and $PN_Q$.

Within PN despreader 542, the I channel component is provided to multipliers 502 and 508. Multiplier 502 multiplies the I component of the received signal by $PN_I$, and provides the result to a summing input of summer 510. Multiplier 508 multiplies the I component of the received signal by $PN_Q$ and provides the result to a subtracting input of summer 512. The Q channel component is provided to multipliers 504 and 506. Multiplier 504 multiplies the Q component of the received signal by $PN_I$, and provides the result to a summing input of summer 510. Multiplier 506 multiplies the Q component of the received signal by $PN_Q$ and provides the result to a summing input of summer 512.

The resultant sequence from summer 510 is provided to channel despreader 514 and accumulator 518. In channel despreader 514, the sequence is multiplied by a short Walsh sequence to remove the channelization. The resultant product sequence is provided to accumulator 522 which accumulates the product sequence over the short Walsh sequence interval and provides the result to dot product elements 530 and 536.

The resultant sequence from summer 512 is provided to channel despreader 516 and accumulator 520. In channel despreader 516, the sequence is multiplied by a short Walsh sequence to remove the channelization. The resultant product sequence is provided to accumulator 524 which accumulates the product sequence over the short Walsh sequence interval and provides the result to dot product elements 532 and 534.

In accumulator 518, the I component of the PN despread sequence is summed over the short Walsh sequence interval and the result is provided to pilot filter 526. Pilot filter 526 is a low pass filter that reduces the noise on the pilot signal and provides the result to a second input of multipliers 530 and 532. Similarly, in accumulator 520, the Q component of the PN despread sequence is summed over the short Walsh sequence interval and the result is provided to pilot filter 528. Pilot filter 528 is a low pass filter that reduces the noise on the pilot signal and provides the result to a second input of multipliers 534 and 536.

The product sequence from multiplier 530 is provided to a first summing input of summer 538. The product sequence from multiplier 534 is provided to a second input of summer 538. The resultant sum from summer 538 is output as soft decision data. The product sequence from multiplier 532 is provided to a first summing input of summer 540. The product sequence from multiplier 536 is provided to a subtracting input of summer 540. The resultant difference from summer 538 is output as soft decision data.

In addition, the outputs of pilot filters 526 and 528 are provided to demultiplexer 544. Demultiplexer 544 removes the estimates of the power control bits from the combined pilot and power control bit channel.

II. Centralized Power Control Based on Power Control Command Feedback

In the first exemplary embodiment for aligning the transmission power levels, base stations 4 and 6 are controlled by base station controller 2. In the first exemplary embodiment, the base station 4 receives the power control commands from mobile station 8 and provides the power control commands to backhaul transceiver 18. Backhaul transceiver 18 transmits the power control commands and the quality indicators to base station controller 2. Base station controller 2 is connected to base stations 4 and 6 by means of wireline connection, fiber optic connection or wireless connection.

Base station controller 2 receives the power control commands from base station 4 and base station 6 at base station controller receiver (BSC RCVR) 10. The power control commands are provided to power control processor 12. Power control processor determines the correct power control command by a number of possible methods: majority vote (where a tie can be broken by giving one transmitter a higher weight), dominant transmitter (where one transmitter's command is always used), averaging, or weighted averaging (based on a set of static or dynamic weights determined by the short-term or long-term SNR for each transmitter's signal at the receiver). If averaging or weighted averaging is used, the resulting command can be mapped to the actual adjustment by one of the methods in FIG. 7. Power control processor 12 then provides the command to packetizer 14. Packetizer 14 incorporates the power control command into outgoing commands and provides the packet to router 16. Router 16 routes the power control command to base station 4 and base station 6.

In base station 4, the power control command is received by backhaul transceiver 18. Backhaul transceiver 18 provides the power control command to control processor 24. Control processor 24 generates a command to adjust the transmit power of the transmitter sending traffic signals to mobile station 8 and provides the command to transmit subsystem 20. This command can be a direct application of what is sent by base station controller 2, or it can be a mapping similar to FIG. 7 from what was sent by base station controller 2 if the latter just provides a common command. Similarly, in base station 6, the power control command is received by backhaul transceiver 30. Backhaul transceiver 30 provides the power control command to control processor 36. Control processor 36 generates a command to adjust the transmit power of the transmitter sending traffic signals to mobile station 8 and provides the command to transmit subsystem 32. By providing the power control commands from base station controller 2, it is assured that the power control commands executed by base station 4 and base station 6 will be the same commands which will keep the transmit power from the two base stations aligned according to the desired pattern.

In a modified version of the fist exemplary embodiment of the present invention, base stations 4 and 6 send an indication of the quality of the reverse link back to base station controller 2. Note that the quality indicator can be one or multiple of the following: the reverse link SNR, signal power, reverse frame erasure, reverse link re-encoded symbol error rate, or number of iterations by the reverse Turbo decoder). Note also that the quality indicator can be sent at a different rate from the rate of feedback commands. For example, there can be only one multiple-bit SNR value sent from the base stations to the base station controller 2 for every frame of 16 feedback commands. Power control processor 12 uses the reverse link quality measurement in determining the correct power control command by a number of different methods. It can choose the command corresponding to the best quality indicator value, choose the average of the multiple commands that all corresponding to the best quality indicator value, or use a quality-indicator weighted average of the commands as the 'correct' command. It can then use one of the hard or soft mappings in FIG. 7 to determine the actual power control adjustment step. For example, if base station 4 received an "up" command from base station 4 and a "down" command from base station 6 then there would be a conflict as to which command to send. In this case power control processor 12 selects the power control command provided from the base station receiving the stronger reverse link signal. If multiple transmitters have quality indicators with the same highest value, power control processor 12 can use the average of the corresponding commands.

In a second modified version of the first exemplary embodiment, the base station receiving the power control command acts on the basis of the command that it receives and subsequently adjusts its power after receiving the power control command from base station controller 2, when it has made an error in the reception of the power control command. So for example, if base station 4 receives a reverse link frame of data from mobile station 8 and erroneously detects an "UP" command. The "UP" command is provided from receive subsystem 26 to control processor 24 which sends a command to transmit subsystem 20 to turn up its power.

In addition, base station 4 provides the power control command to backhaul transceiver 18 which relays this command to base station controller 2. At base station controller 2, power control processor 12 determines that the power control command should have been a "DOWN" command. The down command is provided through packetizer 14 and router 16 and sent to base stations 4 and 6. In base station 4, control processor 24 determines that the command that it sent to transmit subsystem 20 was in error. In response to this determination, control processor 24 issues a command to transmit subsystem 20 to reduce the transmission power of signals to mobile station 8 to the level the power would have been at were the power control command received correctly.

III. Centralized Power Control Based on Reduced Power Control Command Feedback

In the second exemplary embodiment of the present invention, base station controller 2 periodically receives a final transmit level and an aggregate quality measure from each of the base stations. For example, assume that base station controller 2 is only asked to provide centralized power control once every 20 ms. In the exemplary embodiment, 800 power control commands are sent from mobile station 2 every second. Thus, 16 commands are received and acted on by base stations 4 and 6 for each time that base station controller 2 intervenes to change the transmit power.

In base station 4, power control commands are received from mobile station 8. The power control commands are provided to control processor 24. Control processor generates a power adjustment command and provides the command to transmit subsystem 20. This adjustment command can be generated by one of the hard or soft mappings in FIG. 7. In response to the power adjustment command from control processor 24, transmit subsystem 20 turns up, down, or let stay the transmit power of transmission to mobile station 8. In addition, control processor 24 generates a running metric indicative of the quality of the reverse link feedback channel since the last time it sent power control information back to base station controller 2. Note that the quality indicator can be one or multiple of the following: the reverse link SNR, signal power, reverse frame erasure, reverse link re-encoded symbol error rate, or number of iterations by the reverse Turbo decoder). At the end of a predetermined time interval, control processor 24 generates a power control message containing the accumulated reverse link quality metric and the current transmit power of transmissions to mobile station 2. The message is provided to backhaul transceiver 18 and sent to base station controller 2.

Similarly, in base station 6, power control commands are received from mobile station 8. The power control commands are provided to control processor 36. Control processor 36 generates a power adjustment command and provides the command to transmit subsystem 32. In response to the power adjustment command from control processor 36, transmit subsystem 32 turns up or down the transmit power of transmission to mobile station 8. In addition, control processor 36 generates a running metric indicative of the quality of the reverse link feedback channel since the last time it sent power control information back to base station controller 2. At the end of a predetermined time interval, control processor 36 generates a power control message containing the accumulated reverse link quality metric and the current transmit power of transmissions to mobile station 2. The message is provided to backhaul transceiver 30 and sent to base station controller 2.

Base station controller 2 receives the power control message from base station 4 and base station 6 at base station controller receiver (BSC RCVR) 10. The power control commands are provided to power control processor 12. Power control processor 12 determines the correct transmit power for base station 4 and base station 6 and provides this transmit power level to packetizer 14. Power control processor's determination of the proper transmit levels can be achieved by a number of different methods. It can choose the command corresponding to the best quality indicator value, choose the average of the multiple commands that all corresponding to the best quality indicator value, or use a quality-indicator weighted average of the commands as the 'correct' command. It can then use one of the hard or soft mappings in FIG. 7 to determine the actual power control adjustment step. Packetizer 14 incorporates the power control command into outgoing commands and provides the packet to router 16. Router 16 routes the power control command to base station 4 and base station 6.

In base station 4, the power control command is received by backhaul transceiver 18. Backhaul transceiver 18 provides the power control command to control processor 24. Control processor 24 generates a command to adjust the transmit power of the transmitter sending traffic signals to mobile station 8 and provides the command to transmit subsystem 20. This adjustment is the difference between the 'correct' level from control processor 2 and the level actually used by transmit subsystem 20 at the same time. Similarly, in base station 6, the power control command is received by backhaul transceiver 30. Backhaul transceiver 30 provides the power control command to control processor 36. Control processor 36 generates a command to adjust the transmit power of the transmitter sending traffic signals to mobile station 8 and provides the command to transmit subsystem 32.

IV. Centralized Power Control Based on Base Station Transmit Power and Divergence Thresholds In the fourth exemplary embodiment of the present invention, base station controller 2 periodically receives the transmit level of transmissions from base station 4 and 6. However, base station controller 2 will only send the transmit power correction message when the transmission power of signals to mobile station 8 have diverged beyond a threshold value.

In base station 4, power control commands are received from mobile station 8. The power control commands are provided to control processor 24. Control Processor generates a power adjustment command and provides the command to transmit subsystem 20. In response to the power adjustment command from control processor 24, transmit subsystem 20 turns up or down the transmit power of transmission to mobile station 8. At the end of a predetermined time interval, control processor 24 generates a message indicative of the current transmit power of transmission to mobile station 2. The message is provided to backhaul transceiver 18 and sent to base station controller 2.

Similarly, in base station 6, power control commands are received from mobile station 8. The power control commands are provided to control processor 36. Control processor 36 generates a power adjustment command and provides the command to transmit subsystem 32. In response to the power adjustment command from control processor 36, transmit subsystem 32 turns up or down the transmit power of transmission to mobile station 8. At the end of a predetermined time interval, control processor 36 generates a message indicative of the current transmit power of transmission to mobile station 2. The message is provided to backhaul transceiver 30 and sent to base station controller 2.

Base station controller 2 receives the power control messages from base station 4 and base station 6 at base station controller receiver (BSC RCVR) 10. The messages indicative of the transmit power of transmission to mobile station 2 are provided to power control processor 12. Power control processor 12 determines whether the transmit power of base station 4 and the transmit power of base station 6 have diverged beyond a threshold value X. If the transmit power of base station 4 and the transmit power of base station 6 have not diverged beyond a threshold value X, then base station controller 2 sends no power correction message.

If the transmit power of base station 4 and the transmit power of base station 6 have diverged beyond a threshold value X, then power control processor 12 computes the aligned transmit power for base station 4 and base station 6 and provides this transmit power level to packetizer 14. In the exemplary embodiment, power control processor 12 computes the average transmit power and transmits this average energy value to base stations 4 and 6. In a first alternative implementation, power control processor 12 computes the change needed in base station 4 and base station 6 and transmits the necessary change to each of base stations 4 and 6. In a second alternative embodiment, base station controller 2 provides a simple power modification command to either base station 4 or base station 6, in response to which base station 4 or 6 adjusts its transmit power by a fixed amount. Packetizer 14 incorporates the power control command into outgoing commands and provides the packet to router 16. Router 16 routes the power control command to base station 4 and base station 6.

In base station 4, the power control command is received by backhaul transceiver 18. Backhaul transceiver 18 provides the power control command to control processor 24. Control processor 24 generates a command to adjust the transmit power of the transmitter sending traffic signals to mobile station 8 and provides the command to transmit subsystem 20. Similarly, in base station 6, the power control command is received by backhaul transceiver 30. Backhaul transceiver 30 provides the power control command to control processor 36. Control processor 36 generates a command to adjust the transmit power of the transmitter sending traffic signals to mobile station 8 and provides the command to transmit subsystem 32.

In an alternative implementation, the correction to the transmit power is made incrementally over the time interval between adjustment commands. In the exemplary embodiment of this implementation, the adjustment is made during the period between receipt of adjustment commands from base station controller 2 and is made such that the adjustment is completed just prior to receiving the subsequent power adjustment command from base station controller 2.

V. Improved Method for Determining Aligned Transmit Power Level

In a first improved method for determining the aligned transmit power level, the computed aligned transmit power level is determined in accordance with a quality indicator for the reverse link power control feedback. The quality indicator can be based on the strength of the received reverse link pilot signal or alternatively on the time the pilot is in lock at each of the base stations. Alternatively, the quality indicator is based on the number of reverse link frame erasures at a given base station or the signal to interference ratio at mobile station 8 such as pilot $E_c/Nt$ summed over all fingers locked on a given base station.

In these improved methods of determining the aligned power level, base station controller 2 computes a weighted average of the different transmit powers from base stations 4 and 6. Power control processor 12 computes the weighted average and sends this weighted average to base stations 4 and 6. These methods improve the estimate of the aligned transmit power because they emphasize the transmit power of the base stations that have superior reverse link characteristics. Although, not perfectly correlated, the correlation between the forward link and the reverse link path losses is positive. In this weighted averaging fashion, the transmitter in the base station receiving the strongest reverse link is corrected the least.

VI. Soft Mapping Between Feedback Commands and Transmit Power Adjustment

In the sixth exemplary embodiment, the transmitters and/or the control unit apply a soft mapping between the received feedback strength and the amount of transmit level adjustment. That is, the step size in the adjustment is a real number whose value depends on the value of the feedback command signal to noise ratio. A threshold can be set so that when the signal to noise ratio of the feedback is too low, the power control step size is zero. Additionally, when the feedback receiver at a transmitter is out of lock and no feedback SNR can be measured, there will be no corresponding adjustment for the transmit level. If a control unit has access to the quality of the feedback commands at the transmitters, it can use the same soft mapping to determine the most likely commands (for the first exemplary embodiment) or the most likely transmit level or traffic to pilot ratio based on the most recent feedback quality (for the second exemplary embodiment).

Figure 7A:
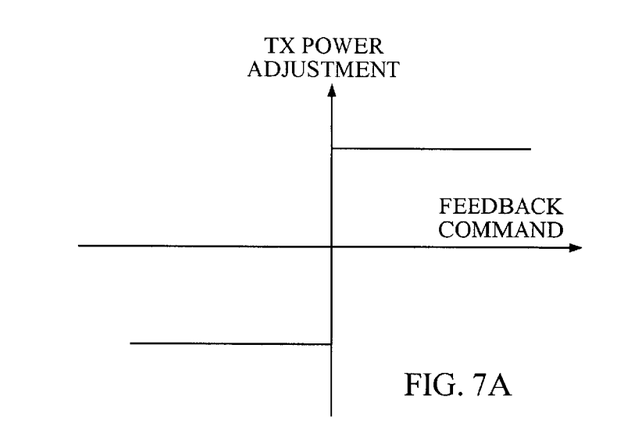
FIGS. 7A–7D illustrate an exemplary implementation of the present invention performing a soft mapping between power control commands and transmit level adjustments.

Turning to FIGS. 7A–7D, the horizontal axis represents the signal to noise ratio (SNR) of the received reverse link feedback commands and the y axis is indicative of the amount of adjustment to the transmission power that is made in response to the power control command received at that level of SNR. FIG. 7A illustrates the general method where regardless of the signal to noise ratio of the feedback commands the transmission power is adjusted by a fixed amount.

Figure 7B:
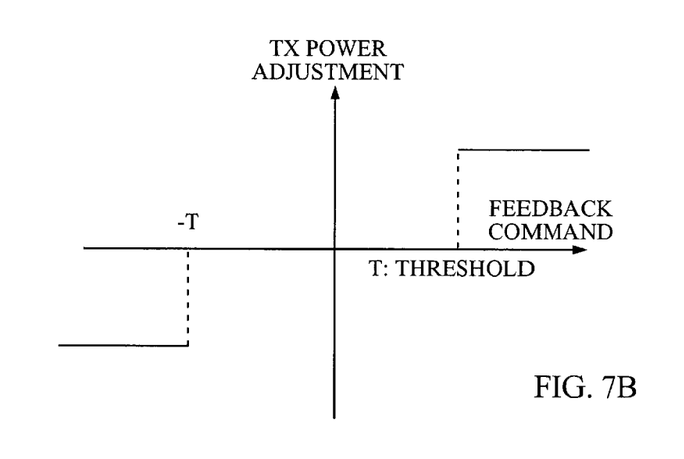

FIG. 7B illustrates a modified method that does take into account the SNR of the feedback commands. For power control commands received with an SNR below the threshold T, no adjustment to the transmission power is made. When the SNR of the feedback command exceeds threshold T, then the transmission power is adjusted by a fixed amount. This soft mapping can be performed either in the base station or in the centralized control unit.

Referring to FIG. 1, if the soft mapping is performed in base station 4, then upon receipt of the power control command, control processor 24 would determine the signal to noise ratio of the reverse link signal at the time of receipt of the power control command. If the computed SNR exceeds the threshold then a signal indicative of power adjustment is provided from control processor 24 to transmit subsystem 20 indicating the adjustment of the transmission level. If the measured SNR falls below the threshold T, the transmission power is not adjusted.

If this soft mapping is performed in control unit 2, then base stations 4 and 6 send indications of the SNR of the power control commands back to control unit 2. Control unit 2 can either combine the SNR values of the two received signals and then map that into a computed adjustment or control unit 2 can compute the adjustment indicated for each of the received signals and combine the result. This computed adjustment is then provided to base stations 4 and 6.

Figure 7C:
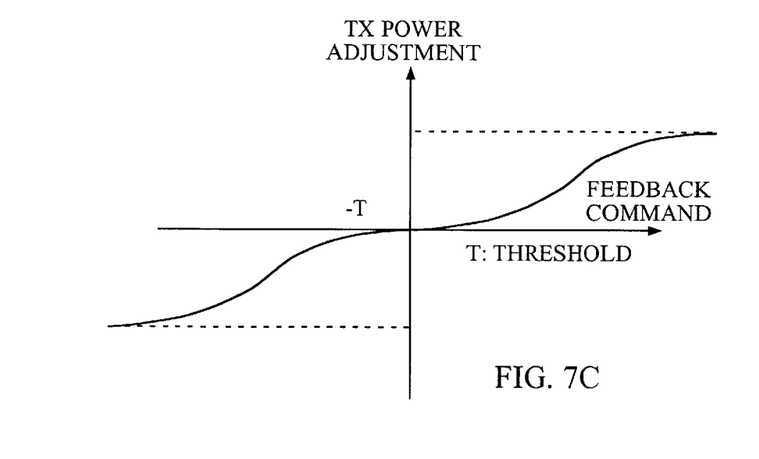

FIG. 7C illustrates a modified method that does take into account the SNR of the feedback commands and provides for a graduated response to power control commands based on the SNR. Again, for power control commands received with an SNR below the threshold T, no adjustment to the transmission power is made. When the SNR of the feedback command exceeds threshold T, then the transmission power is adjusted by an amount that depends on the SNR of the received signal. This soft mapping can be performed either in the base station or in the centralized control unit.

Referring to FIG. 1, if the soft mapping is performed in base station 4, then upon receipt of the power control command, control processor 24 would determine the signal to noise ratio of the reverse link signal at the time of receipt of the power control command. If the computed SNR exceeds the threshold then a signal indicative of power adjustment is provided from control processor 24 to transmit subsystem 20 indicating the adjustment of the transmission level. If the measured SNR falls below the threshold T, the transmission power is not adjusted.

If this soft mapping is performed in control unit 2, then base stations 4 and 6 send indications of the SNR of the power control commands back to control unit 2. Control unit 2 can either combine the SNR values of the two received signals and then map that into a computed adjustment or control unit 2 can compute the adjustment indicated for each of the received signals and combine the result. This computed adjustment is then provided to base stations 4 and 6.

Figure 7D:
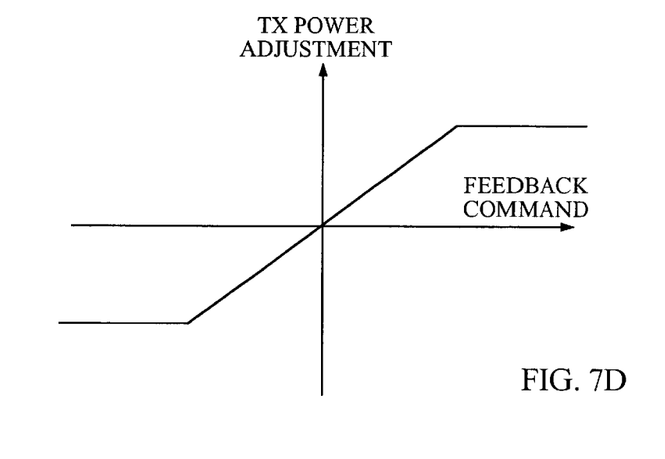

FIG. 7D illustrates a modified method that does take into account the SNR of the feedback commands and provides for a graduated response to power control commands based on the SNR. Again, for power control commands received with an SNR below the threshold T, an adjustment less that a fixed adjustment is made. When the SNR of the feedback command exceeds threshold T, then the transmission power is adjusted by a fixed amount. This soft mapping can be performed either in the base station or in the centralized control unit.

Referring to FIG. 1, if the soft mapping is performed in base station 4, then upon receipt of the power control command, control processor 24 would determine the signal to noise ratio of the reverse link signal at the time of receipt of the power control command. If the computed SNR exceeds the threshold then a signal indicative of the fixed power adjustment is provided from control processor 24 to transmit subsystem 20 indicating the adjustment of the transmission level. Otherwise a signal indicative of the varying transmission power adjustment is provided to transmit subsystem 20.

If this soft mapping is performed in control unit 2, then base stations 4 and 6 send indications of the SNR of the power control commands back to control unit 2. Control unit 2 can either combine the SNR values of the two received signals and then map that into a computed adjustment or control unit 2 can compute the adjustment indicated for each of the received signals and combine the result. This computed adjustment is then provided to base stations 4 and 6.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for a communication system, comprising:

maintaining a communication between a mobile station and a first base station via a forward link signal and a reverse link signal;

generating a first transmission power message for determining power level of transmission of said forward link signal;

transmitting a redundant version of said forward link signal to said mobile station from a second base station;

receiving said reverse link signal from said mobile station at said second base station;

generating a second transmission power message for determining power level of transmission of said redundant version of said forward link signal; and receiving said first and second transmission power messages, and sending an aligned power control command to said first base station and said second base station, wherein said first base station and said second base station are simultaneously in communication with said mobile station, wherein said aligned power control command is for producing correlating patterns of power control adjustments at said first and second base stations for transmissions of said forward link signal from said first base station and said redundant version of said forward link from said second base station to said mobile station.

2. The method as recited in claim 1 further comprising:

determining a first estimation of a power control command sent by said mobile station for said first transmission power message;

determining a second estimation of said power control command sent by said mobile station for said second transmission power message.

* * * * *